Feb. 27, 1923.
F. T. HAGUE
1,447,164
MULTIPLE WINDING FOR ALTERNATING CURRENT MACHINES
Filed Jan. 16, 1919
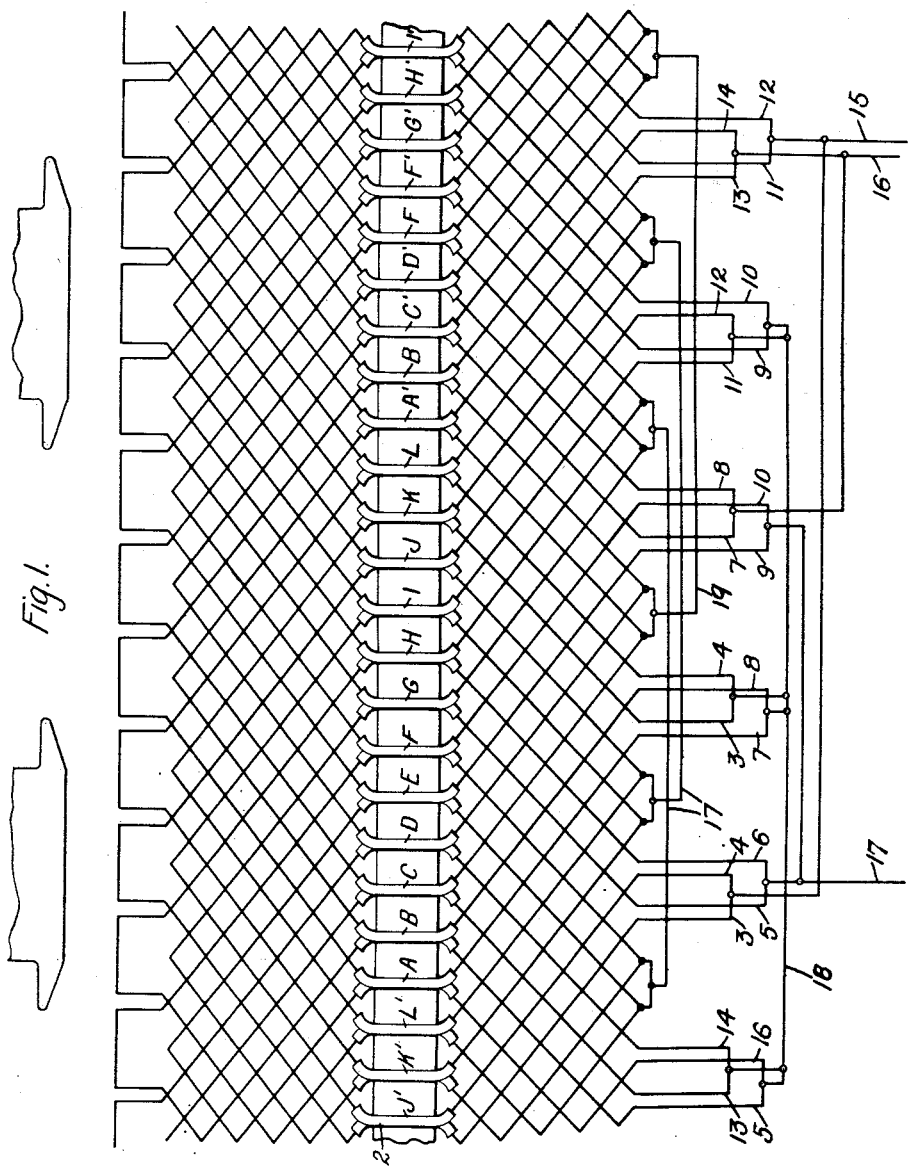
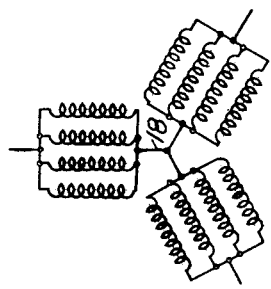
WITNESSES:
J. A. Helsel.
F. A. Lind.
INVENTOR
Floyd T. Hague.
BY
Wesley G. Carr
ATTORNEY Patented Feb. 27, 1923.

1,447,164

UNITED STATES PATENT OFFICE.

FLOYD T. HAGUE, OF PITTSBURGH, PENNSYLVANIA, ASSIGNOR TO WESTINGHOUSE ELECTRIC & MANUFACTURING COMPANY, A CORPORATION OF PENNSYLVANIA.

MULTIPLE WINDING FOR ALTERNATING-CURRENT MACHINES.

Application filed January 16, 1919. Serial No. 271,498.

*To all whom it may concern:*

Be it known that I, FLOYD T. HAGUE, a citizen of the United States, and a resident of Pittsburgh, in the county of Allegheny and State of Pennsylvania, have invented a new and useful Improvement in Multiple Windings for Alternating-Current Machines, of which the following is a specification.

My invention relates to dynamo-electric machines such, for example, as relatively low voltage, high current generators of the alternating-current type and it has particular relation to methods of winding such machines.

The object of my invention is to provide apparatus of the character designated that shall permit a given machine to run at a higher speed for a given frequency or to generate a higher power output at the same speed than is possible with the types of windings heretofore employed.

In the accompanying drawing, Fig. 1 is a developed diagrammatic view of a portion of an armature core provided with slots in which are disposed a plurality of windings wound in accordance with my invention; and Fig. 2 is a diagrammatic view illustrating the general connections of the windings.

The output capacity of an alternating-current machine is limited by the eddy-current losses which are particularly troublesome in high-capacity, low-voltage machines, in fact, the eddy-current losses become prohibitive when a single conductor carries in the neighborhood of 4000 to 5000 amperes.

In view of this limitation, it is desirable to have a number of parallel paths carrying the current, which must, however, be exactly in phase with each other and of exactly the same voltage. If the windings are not of exactly the same phase or potential, a resultant circulation of harmful and useless currents results which materially lessens the efficiency of the machine.

By my invention, I provide a multiple winding in which a number of windings have coils which extend through the same slots and have their ends connected together to form a plurality of parallel paths for the current, whereby the maximum capacity of the machine will be increased directly in proportion to the number of such paths. The coils are wound in pairs, each having alternately long and short-chord slot pitches of the same degree and being so arranged that the portion of the winding having the long-chord slot pitch will be disposed on both sides of that portion of the other winding having the short-chord slot pitch and also so that, in another portion of the same windings, the conditions will be exactly reversed, thus producing a winding which will insure that the voltage and phase relations will be the same. Throughout this specification and in the drawings, a winding having twice as many circuits as poles is described and shown.

In the accompanying drawing, I show an armature core 1 provided with slots 2 within which are disposed a plurality of coils 3 to 14, inclusive, in slots A to L and A' to L', inclusive. These coils are wound in pairs, the coils 3, 4, 11 and 12, for example, being wound so that the ends thereof will be points of equi-potential and may be connected together and so that other points of equipotential may be found throughout the coil. Outlet leads 15, 16 and 17 are connected, at one end, to collector rings, not shown, and, at the other end, each to four separate coils which must be so wound that their potential and phase relations are the same. The common ends of all twelve of the coils are connected together by means of a connection 18, best shown in Fig. 2.

In tracing through the coils connected to the outlet leads, it will be found that, of the four coils connected thereto, two of the coils have a slot pitch of "pitch +1" and the other two have a slot pitch of "pitch —1" all in the direction of progression, and that the coils having the long-chord slot pitch are disposed in immediately adjacent slots on both sides of the coils having the short-chord slot pitch, and also that, before reaching the neutral connection 18, the position of the coils is reversed so that, at the neutral point 18, all of the coils will be of the same potential and phase relation. For example, in tracing through coils connected to the outlet lead 15, coil 3 extends through slots I', J, L' and K, in succession, coil 4 extends through slots J', I, K' and L, coil 11 extends through slots I, J', L and K' and coil 12 extends through slots J, I', K and L', from which it will be seen that each of these coils extends through exactly corresponding slots under the two pole pieces and that, in so doing, the ends of the coils will be of the same potential and phase relation, as will also the mid points of the coils which may be connected together by means of leads 19, if further equalization is found to be necessary. It will be observed that, in extending from the mid point of the coils to either the outlet connection 15 or the neutral point 18, the coils extend through the same or corresponding slots under another pole.

From the foregoing description, it will be understood, by those skilled in the art, that my invention is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a dynamo-electric machine, the combination with an armature core, of a plurality of distinct windings mounted thereon comprising coils connected in pairs, each of said coils having alternate long and short-chord slot pitches in the direction of progression, each of said coils being long-chorded to the same degree that the other coil of the pair is short-chorded.

2. In a dynamo-electric machine, the combination with an armature core, of a plurality of distinct windings comprising coils connected in pairs and mounted thereon, each of said coils having alternate long and short-chord slot pitches in the direction of progression, each of said coils being long-chorded to the same degree that the other coil of the pair is short-chorded and having the long chord throws of the separate coils alternately arranged about said core.

3. In a dynamo-electric machine, the combination with an armature core, of a plurality of distinct coils mounted thereon, each of which comprises a long and a short-chord slot pitch, the long-chorded portion of each of said coils being disposed on both sides of the short-chorded portion of an adjacent coil, the ends of said coils being connected together, and means for collecting current therefrom.

4. In a dynamo-electric machine, the combination with an armature core, of a plurality of distinct coils mounted thereon and connected in pairs, each of which comprises a long and a short-chord slot pitch, the long-chorded portion of each of said coils being disposed on both sides of the short-chorded portion of the other coil of the pair, means connecting points of equi-potential in said coils, and additional means for collecting current therefrom.

5. In a dynamo-electric machine, the combination with an armature core, of a plurality of distinct coils mounted thereon, each of which comprises a long and a short-chord slot pitch, the long-chorded portion of each of said coils being disposed on both sides of the short-chorded portion of the other coil of said pair, and being long-chorded to same degree that the other portions are short-chorded, and means for connecting the ends of the respective coils together, and additional means for collecting current therefrom.

6. In a dynamo-electric machine, the combination with an armature core, of a plurality of distinct coils mounted thereon, each of which has two successive slot pitches in a progressive direction having throws of pole "pitch +1" and pole "pitch −1" respectively, the long slot pitch of each coil being disposed on both sides of the short slot pitch of the other coil of the pair, and the ends of the respective coils being connected together, and means for collecting current therefrom.

In testimony whereof, I have hereunto subscribed my name this 31st day of Dec., 1918.

FLOYD T. HAGUE.